United States Patent [19]

Kelly

[11] 3,922,810
[45] Dec. 2, 1975

[54] FISHING GEAR RETRIEVER

[76] Inventor: Ellsworth A. Kelly, 614 Baker St., Longmont, Colo. 80501

[22] Filed: Jan. 16, 1975

[21] Appl. No.: 541,509

[52] U.S. Cl. ................................................. 43/17.2
[51] Int. Cl.². ......................................... A01K 97/00
[58] Field of Search ................................. 43/17.2, 5

[56] References Cited
UNITED STATES PATENTS

| 2,641,078 | 6/1953 | Gearien | 43/5 |
| 2,714,777 | 8/1955 | Peak | 43/17.2 |
| 3,016,649 | 1/1962 | Ratcliff | 43/17.2 |
| 3,735,520 | 5/1973 | Jarrett | 43/17.2 |

Primary Examiner—Warner H. Camp
Attorney, Agent, or Firm—Horace B. Van Valkenburgh; Frank C. Lowe

[57] ABSTRACT

This retriever moves down a fishing line to which the gear is attached and includes an upper ring and a lower, hollow cylinder, with a transverse slot in the ring and an inclined slot extending downwardly in the cylinder, beginning below the transverse slot of the ring. An upright rod is attached between the ring and cylinder generally opposite the slots, while another rod, which is joined to the first rod at an apex, is spaced laterally from the ring and also laterally from the cylinder down to a position below the inclined slot. A circular clapper is mounted on a pin which is generally transverse to the plane of the rods, but is offset from the center of the cylinder. A shorter rod extending inwardly inside the cylinder is positioned to prevent the clapper from moving downwardly out of the cylinder, while an upper rod extends forwardly to engage the clapper to prevent the clapper from moving to a 90° position.

5 Claims, 5 Drawing Figures

FISHING GEAR RETRIEVER

This invention relates to retrievers for fishing gear, and more particularly to a retriever which will pass down a fishing line and retrieve a lure, plug or the like which is hooked or attached to a sunken log or limbs thereof or the like.

Previous lure retrievers have been generally of two classes, one being those intended to clamp a line and exert a pull on the line, such as U.S. Pat. No. 3,735,520, which includes a central conical passage and a ball therein which is intended to clamp on the line as the retriever is pulled upwardly by a separate cord. However, the ball will usually move upwardly a distance, depending on the rate of descent and the amount of water flowing through the conical passage, so that the ball will not clamp on the line until the retriever is pulled upwardly. Also, if the lure is strongly caught, this retriever will tend to break the fishing line, rather than retrieving the lure.

Another type attempts to dislodge the lure or plug and carry it up with the retriever, as in U.S. Pat. No. 3,550,303 in which a cylinder has a diagonal slot therein and a pivotal attachment at its upper end to a retriever cord. A plurality of angular hooks are pivotally suspended from the lower edge of the cylinder. It is assumed that, if this retriever moves down the line, the hooks suspended from the cylinder will catch on the lure and bring it up. However, there is no certainty that the hooks will catch on the lure, since even though they are angular, they can very easily slip off the lure. Another retriever of this type is shown in U.S. Pat. No. 3,574,967 in which an oval inner loop or oval ring has an outside dimension slightly less than the inside dimension of an outer loop or oval ring. The inner open loop is pivoted closer to one end than the other of the outer loop, while a retrieving cord is attached to the rear end of the inner loop. A bridge across the outer loop prevents the inner loop from moving into position further than a few degrees from the plane of the outer loop, while the outer loop has an offset slot to permit the fish line to be passed into the outer loop. The retriever is designed to pass downwardly along the fish line and to pass over the lure or the like and to engage hooks below the lure. However, the attachment of the cord to the inner loop means that, if at any time during the passage downwardly, the cord arrests the movement of the device down the fish line, the inner loop will be moved to a closed position, which then prevents it from opening again and moving downwardly over the lure to engage the hooks.

The present invention is more expeditious in retrieving lures by providing two separate points of engagement with the fish line, to insure that the retriever will pass downwardly along the fish line and will not become clamped until it reaches the bottom of the fish line and passes over a lure or plug. In addition, the retriever of this invention can be lifted up by the retrieving cord and again dropped down the line, in the event that a clapper does not clamp the lure or plug in a previous movement to the bottom of the line. The retriever of this invention also limits the movement of the clapper, so that the clapper will tend to always be in position to clamp the lure or plug within the retriever, when the retriever cord is pulled upwardly.

The foregoing and additional advantages of this invention will become apparent from the description which follows, taken in conjunction with the accompanying drawings, in which.

Figure 1:
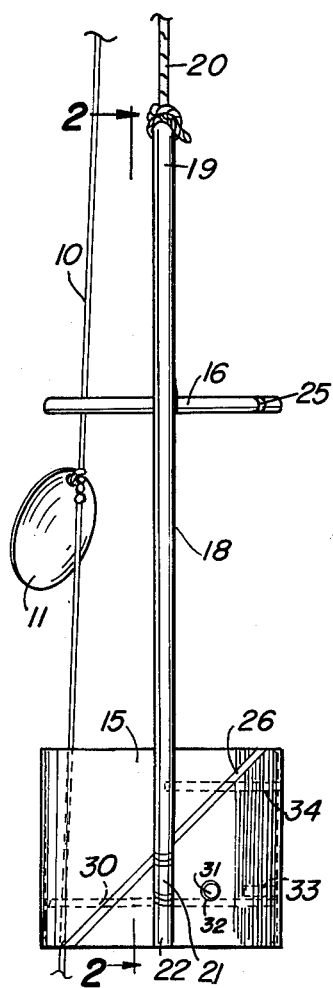
FIG. 1 is a side elevation of a retrieving device of this invention, a portion of a fishing line and a lure being also shown.
Figure 2:
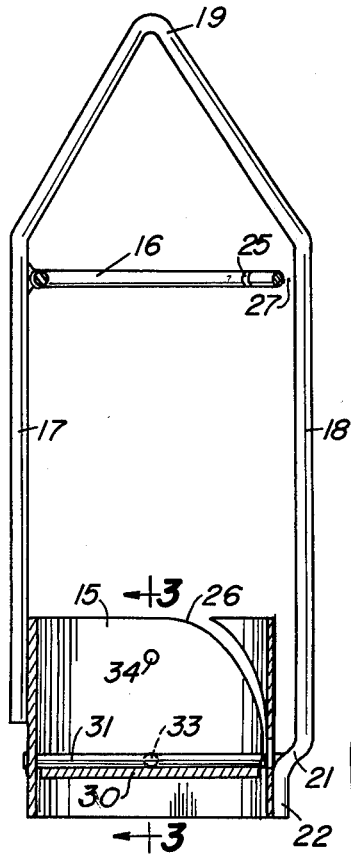
FIG. 2 is a vertical cross section, taken along line 2—2 of FIG. 1.
Figure 5:
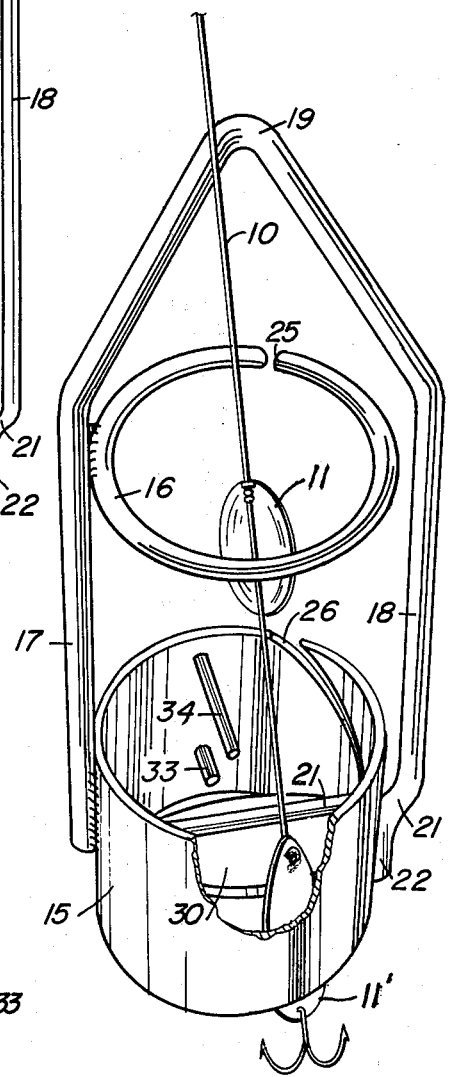
FIG. 5 is a front perspective view of the retriever of FIG. 1, broken away to show the clapper clamped against a lure.

A retriever constructed in accordance with this invention is adapted to be used with a fishing line 10 to retrieve a lure or plug 11 attached to the line. It will be noted that each lure will be provided with a hook or hooks at the bottom, while a plug 11' attached to the lower end of the line or leader is normally provided with a series of hooks. The retriever includes a lower cylinder 15 and an upper ring 16 connected together by a pair of rods 17 and 18 which diverge from an apex 19 to which a cord 20 is attached, as in FIG. 1. Both the cylinder 15 and the ring 16 are attached, as by welding, to the rod leg 17, but the rod leg 18 is spaced from the ring 16 and also from the cylinder 15 for a predetermined distance downwardly to an inward offset 21, with the bottom 22 of the leg 18 being attached to the cylinder 15. A transverse slot 25 in ring 16 and a diagonal slot 26 in cylinder 15 permit the line to be passed into the interior of the retriever, the attachment of rod 18 to the cylinder at leg bottom 22 being below the diagonal slot 26. The operator may place himself at the right of the retriever, as viewed in FIG. 1, and with the line extending downwardly toward the retriever at the opposite side, pull the line around and through the space 27 between ring 16 and leg 18, then into the slot 25 to a position inside the ring and similarly pull the line through slot 26 from the lower edge to the upper edge, and then release the line. It will be noted that with the line thus inside the retriever, the apex 19 and the laterally inclined legs will prevent the line from returning out through slot 25. This same position is also shown in FIG. 5.

Figure 3:
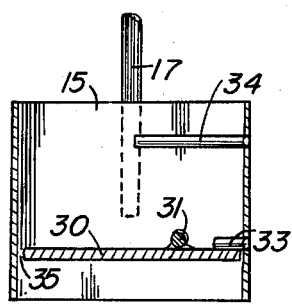
FIG. 3 is a partial vertical section, taken along line 3—3 of FIG. 2 through a lower cylinder of the retriever and showing the clapper in its lower position.

In further accordance with this invention, a pivoted circular plate or clapper 30 is attached to the underside of a pivot pin 31 which extends into opposed holes 32 in the cylinder 15. A lower stop pin 33 and an upper stop pin 34 are attached to cylinder 15, such as by extending into holes in the cylinder and welded thereto from the outside. Stop pin 33 need not be any particular length as long as it prevents the upper edge of clapper 30 from pivoting downwardly further than the horizontal position of FIG. 3. In this connection, the space 35 between the clapper 30 and the inside of cylinder 15 is preferably greater than any line to be encountered, so that the device, even with the clapper in closed position, can slip downwardly along the line until a lure or plug is encountered.

Figure 4:
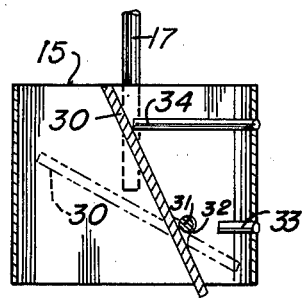
FIG. 4 is a vertical section similar to FIG. 3, but showing the clapper in its maximum upper position and in intermediate position in dotted lines.

The upper stop 34 has a length such that the maximum upward pivoted movement of the clapper is on the order of 60° to 80°, as in FIG. 4. The maximum tilted position of the clapper should be less than 90°, so that the clapper will clamp on a lure or plug when the retriever is pulled upwardly by cord 20. During downward movement of the retriever along the line 10, the cylinder 15 and ring 16 will tend to maintain the retriever in upright position as it moves down the line. The line will move through the lower cylinder 15 and the upper ring 16, while the clapper is pushed upwardly by the pressure of water flowing through the clapper, such as to the upper position of FIG. 4 or the intermediate dotted position of FIG. 4, or a position intermediate the two.

When the retriever has reached the bottom of the fishing line, which will be evident to the user by a slackening of the load on the cord 20, the retriever may be maneuvered slightly, to make sure that it moves to the bottom of a lure or plug. The space between the edge of the clapper and the inside of the lower cylinder, as in FIG. 4, is sufficient for the retriever to pass downwardly over a lure 11 or a plug of a larger size. Then, an upward pull on the cord 20 will move the retriever upwardly, and the force of gravity on the pivotally offset clapper 30 will cause the clapper to engage a lure 11', as in FIG. 5, or to similarly engage a plug or other type of fishing gear. As soon as the clapper is caught on the lure, an upward pull on the cord 20 will serve to pull the hook or hooks loose from whatever obstruction they are snagged on and to pull the lure, plug or the like upwardly with the retriever through the cord 20.

It will be understood that the retriever of this invention is particularly adapted to retrieve trolling gear from a lake or the like. Such trolling gear is moved along the bottom or near the bottom of a lake from a boat moving across the surface of the lake. Thus, it may be made of material of sufficient thickness or diameter to be sufficiently sturdy and rugged for hard useage. Thus, the retriever of this invention may be utilized in recovering trolling gear which is larger and heavier than that shown.

Although a preferred embodiment of this invention has been illustrated and described, it will be understood that other embodiments may exist and various changes made, without departing from the spirit and scope of this invention.

What is claimed is:

1. A fishing gear retriever adapted to move down a fishing line to which said fishing gear is connected, comprising:
   generally coaxial, spaced, generally circular members;
   a slot in each member which permits a fishing line to be moved to a position inside said member, the lower of said members being cylindrical and provided with an inclined slot;
   means connecting said members, including a first upright rod attached to each of said members and a second upright rod spaced from the upper circular member and spaced from said lower cylindrical member downwardly to a point below said slot; and
   clamping means carried by one of said members for engaging said fishing gear.

2. A fishing gear retriever as defined in claim 1, wherein:
   said clamping means includes a clapper; and
   means for pivotally mounting said clapper within and at a position offset from the center of said lower member.

3. A fishing gear retriever adapted to move down a fishing line to which said fishing gear is connected, comprising:
   generally coaxial, spaced, generally circular members;
   a slot in each member which permits a fishing line to be moved to a position inside said member, the lower of said members being cylindrical;
   means connecting said members;
   clamping means carried by the lower of said members, including a clapper;
   means for pivotally mounting said clapper within and at a position offset from the center of said lower member;
   said clapper being substantially imperforate but the clearance span between said clapper and said cylinder, with said clapper in a position generally transverse to said cylinder, being sufficient for said line to move in said clearance space;
   a stop for restricting movement of said clapper in one direction to a substantially horizontal position mounted within said cylinder; and
   a stop for limiting the upward pivotal movement of said clapper to less than 90° and also mounted within said cylinder.

4. A fishing gear retriever as defined in claim 1, wherein:
   said upper member is a circular ring having a transverse slot therein;
   said lower member is an upright cylinder having an inclined slot at one side and beginning below said ring slot;
   said clamping means includes a pivoted clapper which, in a position across said lower cylinder, leaves a space through which a fishing line may pass, said clapper being pivoted on a rod which extends transversely across said cylinder and offset from the center thereof;
   stop means for preventing said clapper from pivoting downwardly out of said cylinder;
   stop means which limits upward movement of said clapper to less than 90°; and
   each of said stop means being formed by a pin which extends inwardly from a position adjacent the lower edge of said cylinder and at a position near the upper edge of said cylinder, said stop pins being generally perpendicular to the plane of said first and second rods.

5. A fishing gear retriever adapted to move down a fishing line to which said fishing gear is connected, comprising:
   generally coaxial, spaced, generally circular members;
   means connecting said members;
   a slot in each member which permits a fishing line to move to a position inside said member, said slot in the lower of said members being inclined; and
   said means connecting said members at one side, said means extending upwardly above the upper member and downwardly to said lower member on the opposite side, said means at said opposite side being spaced from the upper member and connected to the lower member below said inclined slot.

* * * * *